3,694,219
SPREADABLE FOOD COMPOSITION AND
PROCESS OF MAKING SAME
Kaete Glandorf, Mannheim, and Guenter Scheurer, Hassloch, Germany, assignors to Benckiser-Knapsack GmbH, Ludwigshafen, Rhine, Germany
No Drawing. Filed Apr. 3, 1970, Ser. No. 25,560
Claims priority, application Germany, Apr. 5, 1969,
P 19 17 687.5
Int. Cl. A23c *19/12;* A23l *1/00*
U.S. Cl. 99—1                                                12 Claims

ABSTRACT OF THE DISCLOSURE

A spreadable food composition is obtained by subjecting soybean flour, if desired, with the addition of rennet casein or ripened cheese in the presence of processing salts to a short time heat treatment at a temperature between about 75° C. and about 105° C. and preferably at a temperature of about 90° C.

BACKGROUND OF THE INVENTION

(1) Field of the invention

The present invention relates to a novel and readily spreadable food composition and more particularly to a food composition useful for spreading on bread and other baked goods and to a process of making same.

(2) Description of the prior art

It is known that soybean flour, in nutritional and physiological respect, is an important nutrient material. However, it has not been accepted by the public to the desired extent because it was not possible to convert soybean flour into a food material that can be stored for a prolonged period of time and that is always ready for use.

Attempts have been made to produce meat-like products from soybean flour as described, for instance, in German Auslegeschrift No. 1,005,361 and by S. S. Frank and S. J. Circle in "Food Technology," vol. 13, page 307 (1959) in an article entitled "The Use of Isolated Soybean Protein for Non-Meat, Simulated Sausage Products, Frankfurter and Bologna Type."

Furthermore, soybean cheese has been made by subjecting to fermentation soybean milk prepared by grinding washed and soaked soybeans. See, for instance, L. Herb-Mueller in "Ernaehrungsumschau," vol. 8, page 143 (1961) or C. Richard in "Industries Alimentaries et Agricoles," vol. 76, page 745 (1959). The cheese-like product obtained thereby is comparable to fresh, unripened cheese. It is of only limited storability.

German Patent No. 743,198 describes a process whereby cereal grains and seeds of leguminous plants, such as peas, rice, oats, are subjected to the action of phosphoric acids which contain less water than orthophosphoric acid, and especially polymeric metaphosphoric acids or polyphosphoric acids or their water soluble salts while heating or treating with live steam. Flour ground from grain or leguminous seeds treated in this manner, after cooling and drying, differs from flour ground from untreated seeds by being more readily swellable with water, having a lighter color, tasting better, and being more readily digested. The swollen treated seeds can also be processed to oat flakes and the like.

SUMMARY OF THE INVENTION

It is one object of the present invention to provide a readily spreadable food composition from soybean flour which composition can be used for spreading on bread and other baked goods, is similar to processed cheese, and can be stored for a prolonged period of time.

Another object of the present invention is to provide a simple and effective process of producing such a spreadable food composition from soybean flour.

Other objects of the present invention and advantageous features thereof will become apparent as the description proceeds.

In principle the spreadable food composition according to the present invention is obtained by subjecting soybean flour in an apparatus as it is used in manufacturing processed cheese, in the presence of processing or emulsifying salts to a heat treatment at an increased temperature as conventionally used in the manufacture of processed cheese. The temperature of said heat treatment should be between about 75° C. and about 105° C. and preferably at about 90° C. Preferably water is added to or, respectively, present in the mixture of soybean flour and processing salt in an amount sufficient to impart to the treated flour the consistency of a readily spreadable or cheese-like composition. The heat treatment is of relatively short duration and preferably does not exceed a processing time of about 20 minutes. The resulting cheese-like soybean flour product can be stored for a considerably prolonged period of time.

The processing or emulsifying salts used in this process are those compounds which are conventionally used in the manufacture of processed cheese such as alkali metal orthophosphates or polyphosphates or the alkali metal salts of hydroxy carboxylic acids, especially those of citric acid. Preferred alkali metal polyphosphates are the alkali metal salts of polyphosphoric acids of the formula

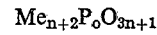

for instance, alkali metal pyrophosphate, alkali metal triphosphate, alkali metal tetraphosphate, or Graham salt, and the like. These salts can be used as such or in mixture with each other or with alkali metal salts of hydroxy carboxylic acids, preferably of aliphatic polyhydroxy carboxylic acids and most advantageously with citrates. The alkali metal salts of hydroxy carboxylic acids and especially the sodium and/or potassium citrate can, of course, also be used without admixture of phosphates.

Preferably the processing salts according to the present invention are employed in amounts exceeding about 0.5% and up to about 4% and most advantageously in amounts between about 2% and about 3%, calculated for the soybean flour to be processed.

The soybean flour may still contain some oil or it may be fully deoiled. Both types of flour can be processed to a homogeneous, spreadable food composition without requiring further additives.

In place of or, respectively, in mixture with soybean flour, there can be used as further starting material the soybean cheese-like product "natto" prepared from soybean milk and inoculated with *Bacillus subtilis* or the like products. See, for instance, Kirk-Othmer "Encyclopedia of Chemical Technology," Second Edition, vol. 18, p. 611, published by John Wiley & Sons, Inc. of New York, 1969.

In order to improve the taste of such a spreadable food composition according to the present invention, rennet casein or fresh or matured cheese made from milk may be added before processing in amounts between about 5% and about 20%, calculated for the soybean flour. The addition of rennet casein or of cheese made from milk serves merely to improve the taste of such a spreadable food composition.

Furthermore, spices and other taste imparting additives, such as tomatoes, cucumbers, paprika, and the like, and even fruits can be added to the processed composition, i.e. in general all those additives the incorporation of which is known from the various types of processed cheese.

According to another embodiment of the present invention, the spreadable food composition can also be prepared by subjecting whole soybeans with the addition of processing salts to a prolonged heat or steam treatment as it is described, for instance, in German Patent No. 743,198 for the treatment of peas, rice, or oats. The thus treated soybeans are cooled, dried, and ground to a fine flour which can then readily be processed with or without the addition of further processing salts according to the present invention to a homogeneous, spreadable food composition.

DESCRIPTION OF THE PREFERRED EMBODIMENTS

The following examples serve to illustrate the present invention without, however, limiting the same thereto.

Example 1

500 g. of soybean flour,
900 g. of water,
5 g. of sodium polyphosphate with 56% $P_2O_5$, and
15 g. of sodium polyphosphate with 65% $P_2O_5$, both serving as processing salts, are heated to 90° C. in a steam-heated, closed container for ten minutes, while stirring. The heated mixture is filled into small plastic-aluminum cups lined with plastic material which are sealed immediately.

Example 2

500 g. of soybean flour,
50 g. of rennet casein, and
900 g. of water are heated as described in Example 1 with 10 g. of sodium tripolyphosphate $Na_5P_3O_{10}$ and filled into containers.

Example 3

500 g. of soybean flour obtained by steam-heating soybeans according to German Patent No. 743,198 in the presence of 2.5 g. of a mixture of 15% of sodium orthophosphate with 50% $P_2O_5$ and 85% of sodium polyphosphate with 69.5% $P_2O_5$ and subsequently grinding the beans to a flour, are heated with 600 cc. of water in a vessel which can be closed, by means of live steam to a temperature of 90° C. for eight minutes. The processed mixture is filled into containers as described in Example 1.

Example 4

300 g. of soybean flour,
30 g. of old Limburger cheese,
600 cc. of water, and
6 g. of sodium polyphosphate mixture with 60.8% $P_2O_5$ are treated as described in Example 1. The resulting processed cheese-like composition is filled into containers.

Example 5

1000 g. of soybean flour,
1500 g. of water, and
35 g. of trisodium citrate are heated in a closed vessel at 105° C. for six minutes, while stirring. The processed soybean flour is filled into containers as described in Example 1.

Example 6

1000 g. of soybean flour,
1800 cc. of water, and a mixture of 12 g. of potassium polyphosphate with 64% $P_2O_5$,
5 g. of potassium polyphosphate with 61% $P_2O_5$, and
3 g. of sodium orthophosphate with 40% $P_2O_5$ are heated in an open vessel at 80° C. for about twenty minutes while stirring. The resulting processed cheese-like, sodium-poor composition is filled into containers.

Example 7

1000 g. of soybean flour,
100 g. of rennet casein,
1800 g. of water, and
a mixture of 30 g. of sodium citrate mixture having a pH of 7.8, and
5 g. of sodium polyphosphate with 64% $P_2O_5$ are heated in an open vessel at 90° C. for about ten minutes while stirring. The resulting processed cheese-like composition is filled into containers.

Example 8

The procedure is the same as described in Example 1 whereby, however, in place of the polyphosphate mixture used as processing salt, there are added 20 g. of a mixture consisting of 15% of disodium orthophosphate, and
85% of Graham salt.

Example 9

The procedure is the same as described in Example 1 whereby, however, in place of the polyphosphate mixture used as processing salt, there are added 15 g. of a mixture consisting of 15% of disodium pyrophosphate,
50% of tetrasodium pyrophosphate,
20% of tripolyphosphate, and
15% of Graham salt.

Example 10

The procedure is the same as described in Example 1 whereby, however, in place of the polyphosphate mixture used as processing salt, there are added 10 g. of a mixture consisting of 50% of disodium orthophosphate,
2.5% of trisodium orthophosphate, and
47.5% of tetrapolyphosphate.

Example 11

The procedure is the same as described in Example 2, whereby, however, in place of soidum tripolyphosphate used as processing salt, there are added 10 g. of a mixture consisting of 80% of tetrasodium pyrophosphate, and
20% of Graham salt.

Example 12

The procedure is the same as described in Example 2, whereby, however, in place of sodium tripolyphosphate used as processing salt, there are added 20 g. of a mixture consisting of 13% of disodium orthophosphate,
12% of disodium pyrophosphate,
48% of tetrapolyphophate, and
27% of Graham salt.

Example 13

The procedure is the same as described in Example 2, whereby, however, in place of sodium tripolyphosphate used as processing salt, there are added 15 g. of a mixture consisting of 25% of trisodium orthophosphate,
50% of Graham salt, and
25% of trisodium citrate.

Example 14

The procedure is the same as described in Example 3 whereby a soybean flour is used as starting material which has been obtained by grinding soybeans previously treated according to German Patent No. 743,198 with 0.5 g. of a mixture consisting of 5% of disodium pyrophosphate,
10% of tetrasodium pyrophosphate,
15% of tripolyphosphate,
30% of tetrapolyphosphate, and
40% of Graham salt.

The resulting treated soybean flour is treated with 4.5 g. of the same mixture of processing salts and 600 cc. of water as described in said Example 3.

Example 15

The procedure is the same as described in Example 4, whereby, however, in place of the sodium polyphosphate used as processing salt, there are added 12 g. of a mixture consisting of 30% of tetrasoidum pyrophosphate,
40% of tetrapolyphosphate,
5% of Graham salt, and
25% of trisodium citrate.

Example 16

The procedure is the same as described in Example 4, whereby, however, in place of the sodium polyphosphate used as processing salt, there are added 9 g. of a mixture consisting of 5% of disodium pyrophosphate,
50% of tetrasodium pyrophosphate,
12% of tripolyphosphate,
10% of tetrapolyphosphate, and
23% of Graham salt.

Example 17

The procedure is the same as described in Example 6, whereby, however, in place of the processing salt mixture used, there are added 20 g. of a mixture consisting of 13% of dipotassium orthophophate,
50% of tetrapotassium pyrophosphate, and
37% of potassium polyphosphate.

Of course, heat treatment with the processing salts is carried out in the presence of water. Preferably such amounts of water are present as they are required to produce a readily spreadable or cheese-like food composition. In general water is added in amounts between about 1000 cc. and about 2500 cc. calculated for 1000 g. of soybean flour. Amounts between about 1200 cc. and about 2000 cc. of water for 1000 g. of soybean flour have proved to be the preferred amounts.

It is, of course, also possible to carry out the heat treatment according to the present invention in an open vessel whereby, however, the evaporated water is replaced during heating, if necessary.

In place of the cheese processing salts used in the preceding examples, there can be used any other cheese processing salts as they are known to the art. In order to produce dietary sodium-poor or sodium-free soybean flour processed cheese-like compositions according to the present invention, the potassium salts of the processing compounds such as potassium orthophosphates and polyphosphates as well as potassium citrate or their mixtures with sodium processing salts are used for the heat treatment as described in Examples 6 and 17.

The optimum amounts of processing salts to be added to the soybean flour are readily determined by preliminary tests. They are dependent upon the type and quality of the soybean flour and upon the type and quality of the processed soybean flour food composition to be prepared.

We claim:
1. A spreadable food composition consisting essentially of a heat-treated mixture of soybean flour, water, and a cheese processing salt in an amount between about 0.5% and about 4%, calculated for the soybean flour, said composition being obtained by the process of claim 3.

2. The food composition according to claim 1, wherein the cheese processing salt is present in an amount between about 2% and about 3%, calculated for the soybean flour.

3. In a process of producing a spreadable food composition, the steps which essentially consist in subjecting soybean flour in the presence of a cheese processing salt and water to a heat treatment at a temperature between about 75° C. and about 105° C. under conditions whereby water evaporation is prevented, the amount of water in the mixture of soybean flour, cheese processing salt, and water being between about 1000 cc. and about 2500 cc. calculated for 1000 g. of soybean flour, and the amount of cheese processing salt being between about 0.5% and about 4%, calculated for the soybean flour, and cooling the resulting mixture.

4. The process according to claim 3, wherein between about 2% and about 3% of the cheese processing salt, calculated for the soybean flour, are present during heat treatment.

5. The process according to claim 3, wherein the temperature during heat treatment is about 90° C.

6. The process according to claim 3, wherein the heat treatment is carried out for a period of time not substantially exceeding 20 minutes.

7. The process of claim 3, in which the mixture of soybean flour, cheese processing salt, and water to be subjected to the heat treatment additionally contains between about 5% and about 20%, calculated for the soybean flour, of a cheese product selected from the group consisting of rennet casein, freshly prepared cheese, and matured cheese.

8. The process of claim 3, in which the cheese processing salt is a sodium polyphosphate.

9. The process of claim 3, in which the cheese processing salt is a sodium salt of a hydroxy carboxylic acid.

10. The process of claim 9, in which the cheese processing salt is sodium citrate.

11. The process of claim 3, in which the cheese processing salt is a mixture of sodium polyphosphate and sodium citrate.

12. The process of claim 3, in which taste improving additives are incorporated into the heat treated mixture of soybean flour, cheese processing salt, and water.

References Cited

UNITED STATES PATENTS

| | | | |
|---|---|---|---|
| 2,161,401 | 6/1939 | Doering et al. | 99—117 |
| 3,310,406 | 3/1967 | Webster | 99—117 X |
| 2,795,502 | 6/1957 | Raymond | 99—144 |
| 2,081,273 | 5/1937 | Guttenberg | 99—117 |

FOREIGN PATENTS

| | | | |
|---|---|---|---|
| 215,845 | 7/1958 | Australia | 99—99 |
| 554,438 | 7/1943 | Great Britain | 99—99 |

RAYMOND N. JONES, Primary Examiner

J. M. HUNTER, Assistant Examiner

U.S. Cl. X.R.

99—115, 117, 144